United States Patent
Anderson et al.

(10) Patent No.: US 7,249,463 B2
(45) Date of Patent: *Jul. 31, 2007

(54) AERODYNAMIC FASTENER SHIELD FOR TURBOMACHINE

(75) Inventors: William C. Anderson, Springdale, OH (US); Jesse Senyo, Williamstown, KY (US); Michael J. Epstein, Mason, OH (US); Zhifeng Dong, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 338 days.

This patent is subject to a terminal disclaimer.

(21) Appl. No.: 10/941,213

(22) Filed: Sep. 15, 2004

(65) Prior Publication Data

US 2006/0053768 A1    Mar. 16, 2006

(51) Int. Cl.
*F02C 7/20* (2006.01)
*F01D 25/12* (2006.01)

(52) U.S. Cl. .................. 60/798; 415/112; 415/116; 60/39.83

(58) Field of Classification Search .......... 60/796, 60/798, 39.83, 751, 226.1; 415/112, 116
See application file for complete search history.

(56) References Cited

U.S. PATENT DOCUMENTS

| 4,190,397 | A | | 2/1980 | Schilling et al. |
| 4,320,903 | A | * | 3/1982 | Ayache et al. ............ 415/110 |
| 4,662,821 | A | * | 5/1987 | Kervistin et al. .......... 415/116 |
| 4,668,163 | A | * | 5/1987 | Kervistin .................. 415/116 |
| 4,904,156 | A | * | 2/1990 | Touze ....................... 415/190 |
| 5,090,865 | A | | 2/1992 | Ramachandran et al. |
| 5,118,253 | A | * | 6/1992 | Balkcum, III ............ 415/209.2 |
| 7,094,020 | B2 | * | 8/2006 | Dong et al. ................ 415/112 |

* cited by examiner

*Primary Examiner*—Ted Kim
(74) *Attorney, Agent, or Firm*—Adams Evans P.A.; David L. Narciso (57) ABSTRACT

A fastener shield for use in a fluid flow path within a gas turbine engine for reducing fluid drag and heating generated by fluid flow over a plurality of circumferentially spaced fasteners. The fastener shield has a radially-extending, downstream-facing mounting flange with a plurality of circumferentially spaced bolt holes positioned to receive respective engine mounting bolts therethrough and to attach the mounting flange to elements of the turbine engine. A curved, upstream-facing fastener shield cover is positioned in spaced-apart relation to the mounting flange for at least partially covering and separating an exposed, upstream-facing portion of the bolts from the fluid flow to thereby reduce drag and consequent heating of the bolts.

17 Claims, 7 Drawing Sheets

AERODYNAMIC FASTENER SHIELD FOR TURBOMACHINE

GOVERNMENT INTERESTS

This invention was made with government support under government contract No. F33657-99-D-2050 awarded by the Department of Defense. The government has certain rights to this invention.

TECHNICAL FIELD AND BACKGROUND OF THE INVENTION

This invention relates generally to turbomachines such as gas turbine engines and, more particularly, to an improved fastener shield for minimizing temperature rise associated with protrusions in a fluid flow path.

U.S. Pat. Nos. 4,190,397 and 5,090,865, assigned to the assignee of the present invention, each describe the need for and use of fastener shields, referred to therein as "windage shields", in gas turbine engines. In particular, the efficiency of the engine is directly related to the ability of the engine to operate at higher turbine inlet temperatures. The need for higher turbine operating temperatures requires cooling air to be supplied to various components of the engine in order to allow the components to operate at the higher temperatures without being subjected to thermal stress to a degree that is damaging to the engine.

In order to supply cooling air at a temperature that is effective to lower the temperature of the operating components, cooling air is extracted from a compressor section of the engine and routed through various channels to the turbine section. As the cooling air is subjected to work input in passing through these channels, the temperature of the cooling air rises. Elements that have been found to significantly affect work in the cooling fluid flow are nuts and bolt heads utilized in connecting various sections of the turbine together. These fastener elements protrude into the cooling air channels creating aerodynamic drag, causing heating of the cooling fluid in a manner that the cooling air receives more work.

The U.S. Patents referenced above describe fastener shields that improve the performance of gas turbine engines. The fastener shields described therein are particularly useful with flange connections that protrude into the fluid flow passage and are connected together by bolts with heads in the fluid flow passage.

The fastener shield described in the '397 patent includes a continuous ring having a generally L-shaped profile that is captured between the bolt head and an upstream flange. The captured flange portion of the shield is provided with a plurality of circumferentially spaced, milled slots contoured to receive D-shaped bolt heads. These bolt heads are mounted flush with the upstream captured portion of the shield, thus eliminating open access holes and protruding bolts. The combination of D-shaped heads and contoured slots provides a means for torquing the bolts.

Figure 1:
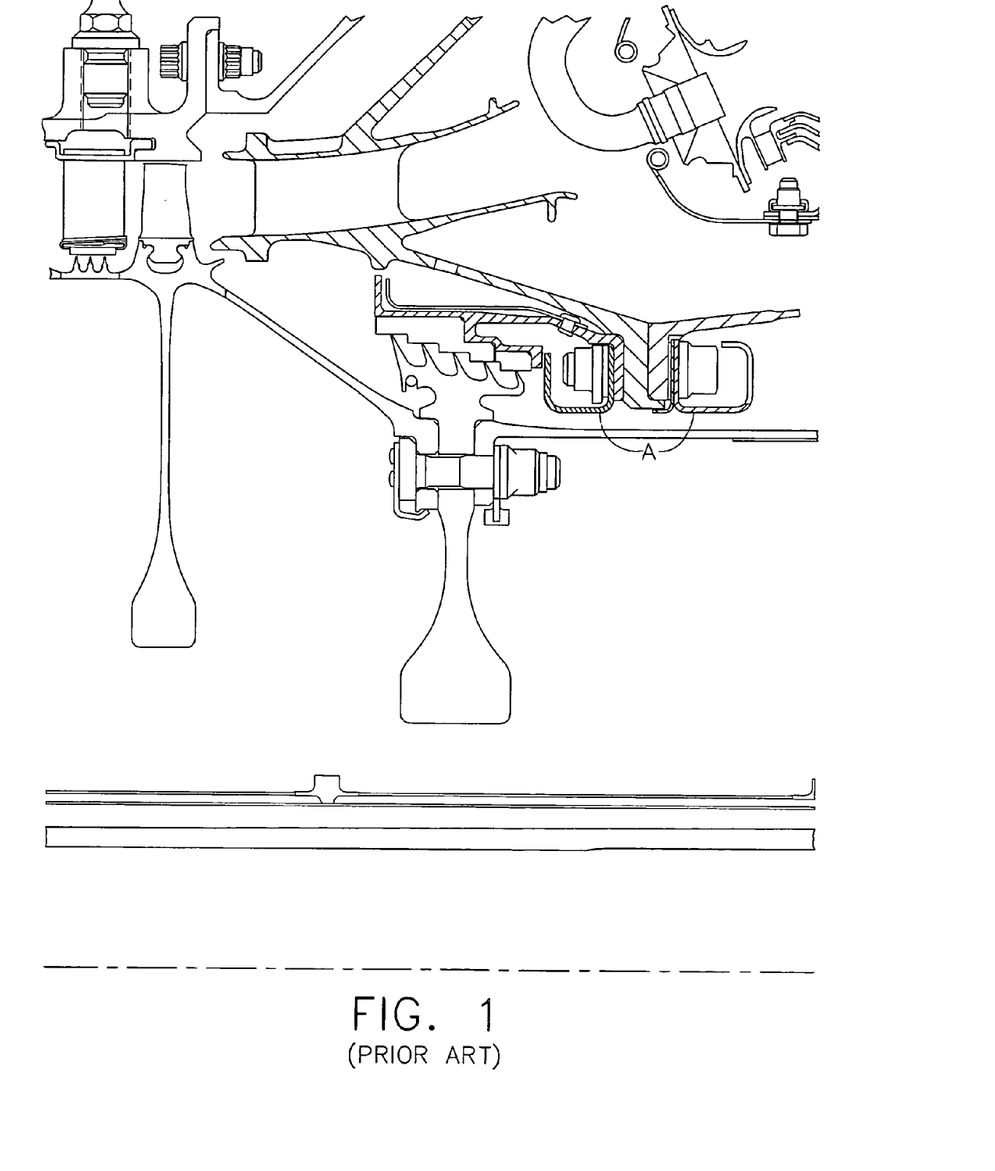
FIG. 1 is a fragmentary vertical cross-section of a prior art fastener shield for a gas turbine engine, as shown in FIG. 3 of U.S. Pat. No. 4,190,397, and discussed above.

The cylindrical section of the L-shaped shield extends downstream of the mating flanges and passes the nut side of the bolted connection to direct cooling air past the nut, thereby minimizing velocity reduction from the nut, and represented a distinct improvement over prior art flange connections, such as shown in FIG. 3 of the '397 patent.

While the fastener shield as described in the '397 patent is effective to reduce drag effects within the fluid flow channel of a gas turbine engine, a plurality of contoured slots must be machined in the surface of the fastener shield facing the fluid flow path so that the heads of the bolts fit into the precision machined slots of the shield. Furthermore, the described fastener shield has an L-shaped cross-section with a portion which extends parallel to the direction of fluid flow within the fluid flow channel with the described intent of directing the main fluid flow past bolt heads on the opposite side of the bolted flange.

However, this extended portion does not eliminate flow over the bolt heads due to secondary circulating fluid fields. Thus, it was desirable to have a fastener shield which did not extend into the fluid flow channel and which did not require the specialty-designed bolt heads or a plurality of precision machined slots for receiving the bolt heads, and which accommodates secondary fluid flows.

The '865 patent thus provides a continuous ring of substantially rectangular cross-section formed with a plurality of circumferentially spaced, arcuate-shaped grooves on a first surface of the ring that are oriented so that the ring may be positioned over the bolt heads within the grooves of the ring. A plurality of apertures formed through the ring are aligned with the apertures in the spaces between adjacent grooves. Each of the apertures has a countersunk portion on an outward side of the ring opposite the side containing the grooves.

At least some of the bolts connecting the flanges together extend through the ring at the apertures for holding the ring in position over the bolt heads. The bolts extending through the ring have heads that are recessed into the countersunk areas, with the top of the bolt heads lying flush with the outer surface of the ring.

The countersunk portions fit snugly around the bolt heads to minimize the area of any cavity which could be exposed and lead to disturbance in the fluid flow path. The ring is designed so that when placed in its operative position over the bolt heads, the lower surface of the ring in which the grooves are formed fits snugly against the flange and one edge of the ring also abuts the annular member to which the flange is attached. Fluid is thus prevented from passing under the fastener shield.

The present invention provides further advantages over the above-described fastener shields by further reducing the temperature through the high pressure turbine forward shaft area.

This is accomplished by separating the fastener shield from the compressor discharge pressure (CDP) seal. This permits the fastener shield to be removed without removing the CDP seal, and allows the fastener shield to thermally expand separately from the CDP seal, thus maintaining sealing performance of the CDP seal over a longer period of time.

BRIEF DESCRIPTION OF THE INVENTION

Accordingly, the present invention provides an improved fastener shield for use in gas turbine engines to minimize temperature rise in cooling fluid flow due to protrusions and, more particularly, to nut and bolt protrusions associated with the flange connections in the coolant flow path. The fastener shield according to the present invention provides an aerodynamic effect to the CDP seal while avoiding attachment of the nuts directly to the CDP seal. This in turn avoids the necessity of having to completely disassemble the engine when a bolt and nut have seized.

The above-recited aspects and advantages are attained in an improved fastener shield for use with bolt head flange connections having bolt heads and nuts which protrude into a fluid flow channel. The shield of the present invention comprises a fastener shield for use in a fluid flow path within a gas turbine engine for reducing fluid drag and heating generated by fluid flow over a plurality of circumferentially spaced fasteners, the fasteners having a portion thereof extending into the fluid flow path.

The fastener shield comprises a radially-extending, downstream-facing mounting flange having a plurality of circumferentially spaced bolt holes positioned to receive respective engine mounting bolts therethrough, and to attach the mounting flange to elements of the turbine engine. A curved, upstream-facing fastener shield cover is positioned in spaced-apart relation to the mounting flange for at least partially covering and separating an exposed, upstream-facing portion of the bolts from the fluid flow to thereby reduce drag and consequent heating of the bolts.

According to one preferred embodiment of the invention, the mounting flange and fastener shield cover are integrally-formed.

According to another preferred embodiment of the invention, the mounting flange and shield cover comprise joined, segmented arcuate elements.

According to yet another preferred embodiment of the invention, the fastener shield comprises a single, integrally-formed annular element.

According to yet another preferred embodiment of the invention, the rotating elements of the turbine engine include radially-extending diffuser frame flanges.

According to yet another preferred embodiment of the invention, the curved shield cover has a bellmouth shape characterized by a progressive curve that simultaneously extends axially upstream against the direction of fluid flow and radially outwardly to a terminus.

According to yet another preferred embodiment of the invention, the terminus is positioned in a plane defined by an extended longitudinal axis of the bolt.

According to yet another preferred embodiment of the invention, a fastener shield is provided for use in a fluid flow path within a gas turbine engine for reducing fluid drag and heating generated by fluid flow over a plurality of circumferentially spaced fasteners, wherein the fasteners have a portion thereof extending into the fluid flow path. The fastener shield comprises a radially-extending, downstream-facing mounting flange having a plurality of circumferentially spaced bolt holes positioned to receive respective engine mounting bolts therethrough, and to attach the mounting flange to elements of the turbine engine. A curved, upstream-facing fastener shield cover is integrally-formed with and positioned in spaced-apart relation to the mounting flange for at least partially covering and separating an exposed, upstream-facing portion of the bolts from the fluid flow to thereby reduce drag and consequent heating of the bolts. The curved shield cover has a bellmouth shape characterized by a progressive curve that simultaneously extends axially upstream against the direction of fluid flow and radially outwardly to a terminus positioned in a plane defined by an extended longitudinal axis of the bolt.

According to yet another preferred embodiment of the invention, the mounting flange and shield cover are segmented to define a plurality of arcuate elements.

According to yet another preferred embodiment of the invention, the rotating elements of the turbine engine comprise radially extending diffuser frame flanges.

According to yet another preferred embodiment of the invention, the turbine engine comprises a low bypass turbofan engine.

According to yet another preferred embodiment of the invention, a fastener shield is provided for use in a fluid flow path within a gas turbine engine for reducing fluid drag and heating generated by fluid flow over a plurality of circumferentially spaced fasteners, the fasteners having a portion thereof extending into the fluid flow path. The fastener shield comprises a plurality of arcuate elements joined to collectively define an annular, radially-extending, downstream-facing mounting flange having a plurality of circumferentially spaced bolt holes positioned to receive respective engine mounting bolts therethrough and to attach the mounting flange to elements of the turbine engine. A curved, upstream-facing fastener shield cover is positioned in spaced-apart relation to the mounting flange for at least partially covering and separating an exposed, upstream-facing portion of the bolts from the fluid flow to thereby reduce drag and consequent heating of the bolts. The curved shield cover has a bellmouth shape characterized by a progressive curve that simultaneously extends axially upstream against the direction of fluid flow and radially outwardly to a terminus positioned in a plane defined by an extended longitudinal axis of the bolt.

According to yet another preferred embodiment of the invention, the mounting flange and fastener shield cover are integrally-formed.

According to yet another preferred embodiment of the invention, the terminus is positioned in a plane defined by an extended longitudinal axis of the bolt.

According to yet another preferred embodiment of the invention, the rotating elements of the turbine engine comprise radially extending diffuser frame flanges.

According to yet another preferred embodiment of the invention, the portion of the fastener extending into the fluid flow path comprises a terminal end portion of the bolt and a nut positioned thereon.

According to yet another preferred embodiment of the invention, the turbine engine comprises a low bypass turbofan engine.

BRIEF DESCRIPTION OF THE DRAWINGS

Other aspects of the invention will appear as the invention proceeds when taken in conjunction with the following drawings, in which.

DESCRIPTION OF THE PREFERRED EMBODIMENT AND BEST MODE

Figure 2:
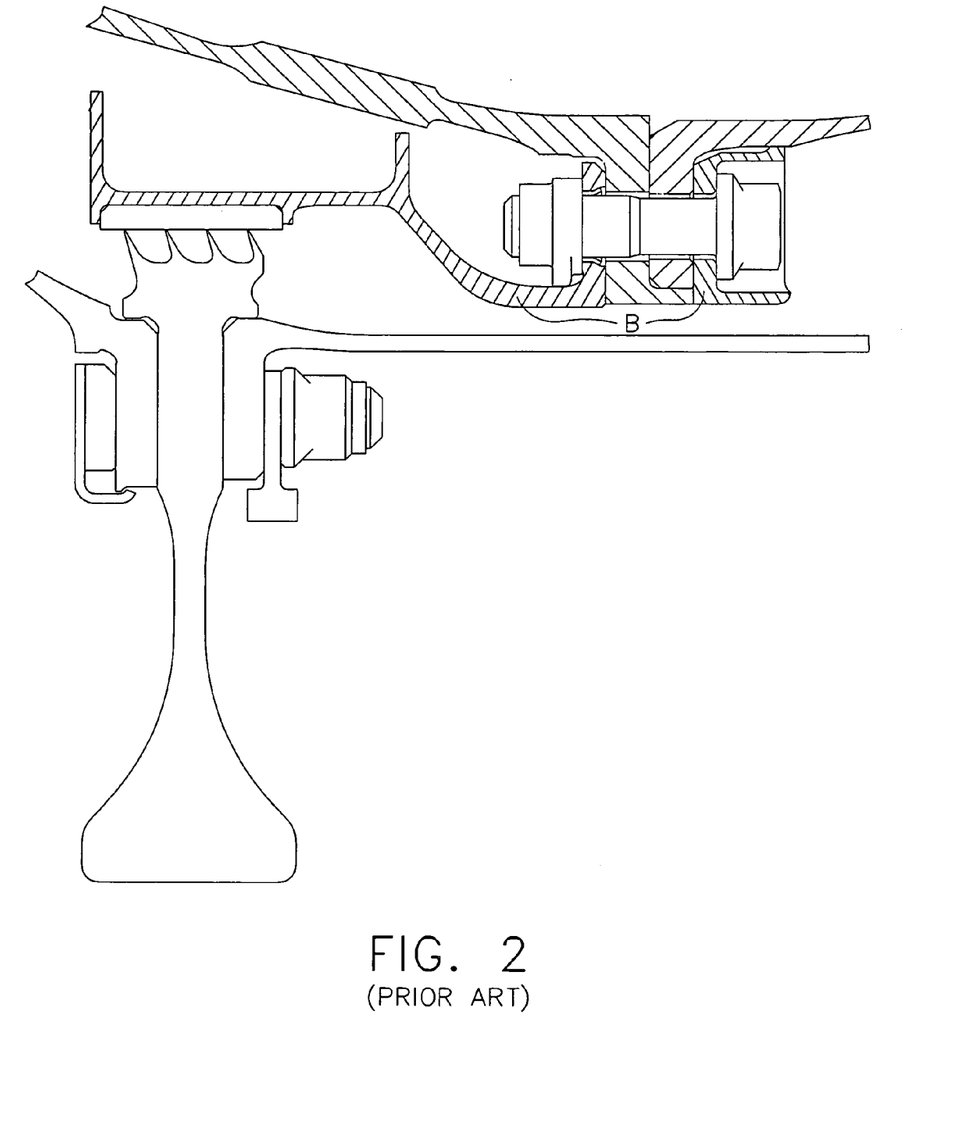
FIG. 2 is a fragmentary vertical cross-section of another prior art fastener shield for a gas turbine engine, as shown in FIG. 5 of U.S. Pat. No. 5,090,865.

Referring now specifically to the drawings, prior art fastener shields are shown in FIGS. 1 and 2 at references A and B, respectively, as discussed above with reference to U.S. Pat. Nos. 4,190,397 and 5,090,865.

Figure 3:
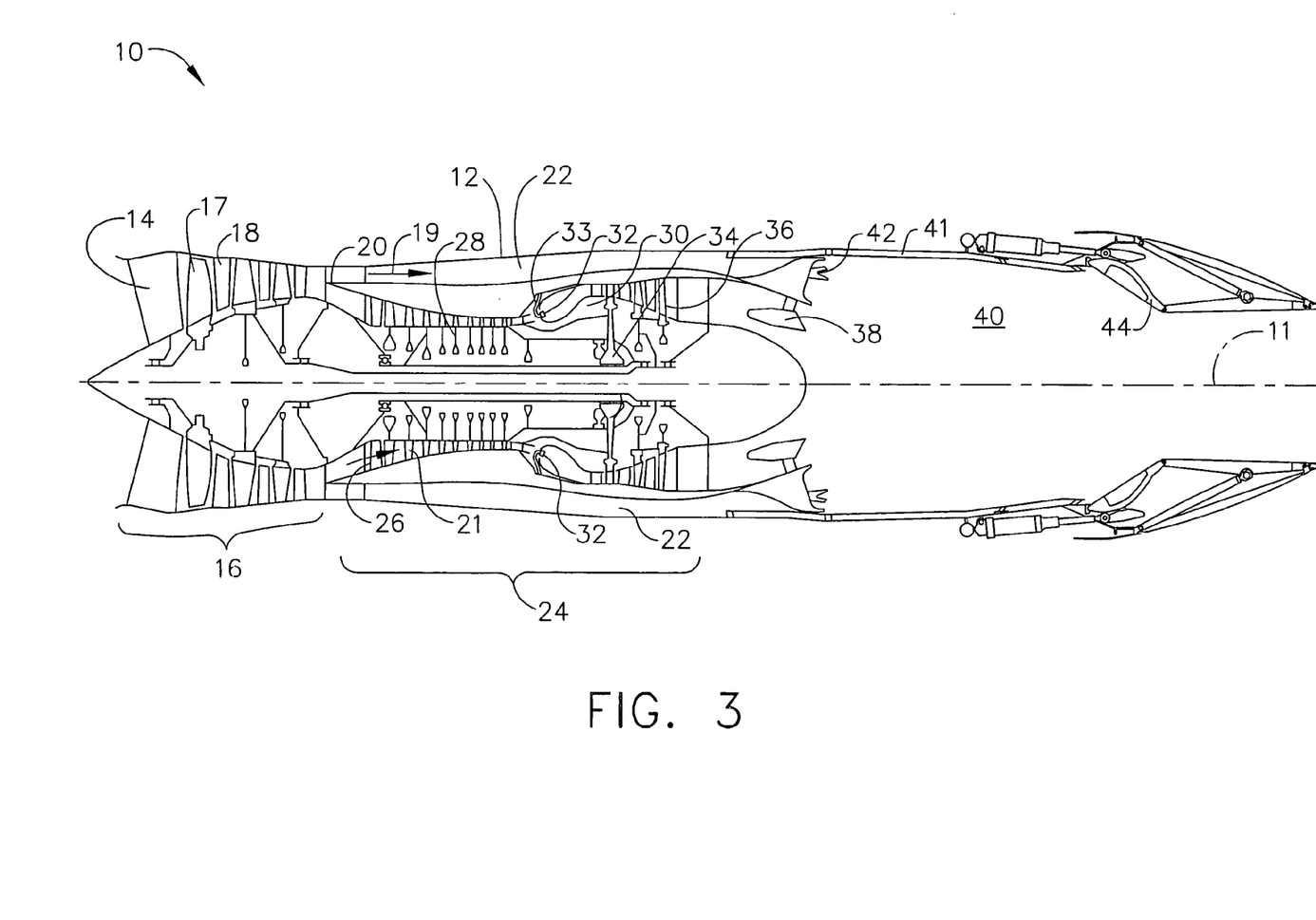
FIG. 3 is a general longitudinal cross-sectional view of a gas turbine engine incorporating a fastener shield in accordance with an embodiment of the present invention.
Figure 4:
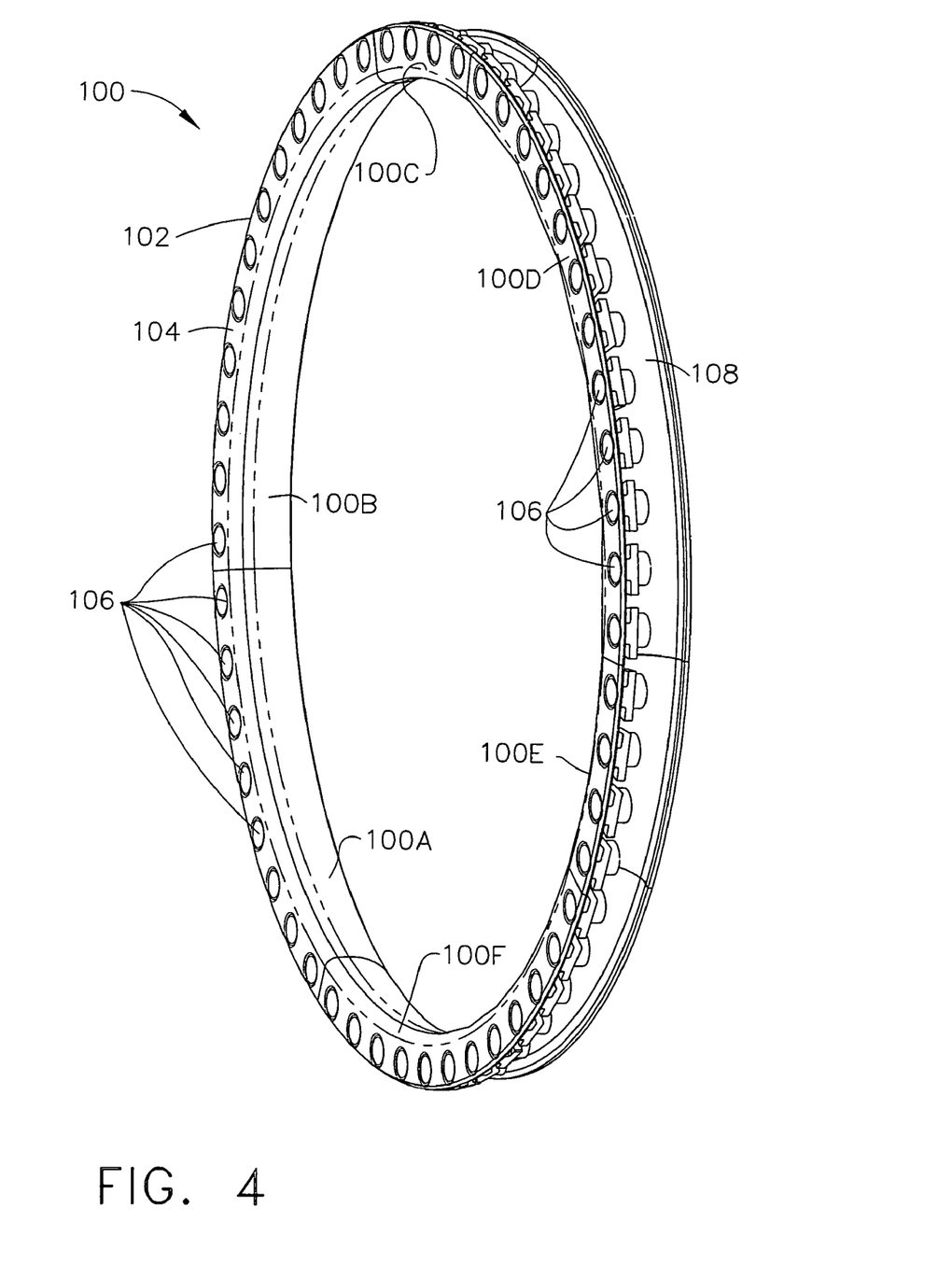
FIG. 4 is a perspective view of a first, downstream, side of a fastener shield in accordance with an embodiment of the present invention.

A gas turbine engine incorporating a fastener shield according to the present invention is illustrated in FIG. 3 and shown generally at reference numeral 10. The engine 10 includes an annular outer casing 12 that encloses the operating components of the engine 10. Engine 10 has a longitudinal axis 11, about which the several rotating components of the engine 10 rotate. An air inlet 14 is provided into which air is drawn. The air enters a fan section 16 containing a fan 17 within which the pressure and the velocity of the inlet air are increased. Fan section 16 includes a multiple-stage fan 17 that is enclosed by a fan casing 18.

Fan outlet air exits from the multiple-stage fan 17 and passes an annular divider 20 that divides the fan outlet air stream into a bypass airflow stream 19 and a core engine airflow stream 21. The bypass airflow stream 19 flows into and through an annular bypass duct 22 that surrounds and that is spaced outwardly from the core engine 24. The core engine airflow stream 21 flows into an annular inlet 26 of core engine 24.

Core engine 24 includes an axial-flow compressor 28 that is positioned downstream of inlet 26 and serves to further increase the pressure of the air that enters inlet 26. High-pressure air exits compressor 28 and enters an annular combustion chamber 30 into which fuel is injected from a source of fuel (not shown) through a plurality of respective circumferentially-spaced fuel nozzles 32. The fuel-air mixture is ignited to increase the temperature of, and thereby to add energy to, the pressurized air that exits from compressor 28. The resulting high temperature combustion products pass from combustion chamber 30 to drive a first, high-pressure turbine 34 that is connected to and thus rotates compressor 28. After exiting high-pressure turbine 34 the combustion products then pass to and enter a second, low-pressure turbine 36 that is connected to and thus rotates the multiple-stage fan 17. The combustion products that exit from low-pressure turbine 36 then flow into and through an augmenter 40 that is enclosed by a tubular casing 41, to mix with bypass airflow that enters augmenter 40 from bypass duct 22. The core engine mass flow of air and combustion products, and the bypass airflow, together exit engine 10 through exhaust nozzle 44, which as shown is a converging-diverging nozzle, to provide propulsive thrust.

In the augmented mode, additional fuel is introduced into the core engine 24 at a point downstream of low-pressure turbine 36. Fuel is also introduced into the bypass air stream at substantially the same position along engine longitudinal axis 11. In that connection, flameholders 38 and 42 are provided in the core engine air flow stream 21 and in the bypass flow stream, respectively, to stabilize the flame fronts in each of the core engine and bypass flow streams 19 and 21, respectively.

The above description is representative of a gas turbine engine and is not meant to be limiting, it being apparent from the following description that the present invention is capable of application to any gas turbine engine and is not meant to be restricted to engines of the turbo-fan variety. For example, the subject invention is applicable both to engines of the gas turbo-jet type and to advanced mixed cycle engines.

Referring now to FIGS. 4—7, the fastener shield 100 according to an embodiment of the invention includes an annular ring 102 having a cross-section that includes a downstream-facing, radially-extending mounting flange 104 having a plurality of bolt holes 106 for bolts 107, and an upstream-facing, radially-extending arcuate fastener shield cover 108. The fastener shield 100 may be formed of segments 100A-F, as shown, or fabricated in a single annular configuration, not shown. The segmented configuration offers the advantage that repairs involving only a portion of the circumference of the engine 10 can be accomplished by removing only the segment or segments necessary to accomplish the repair.

Figure 5:
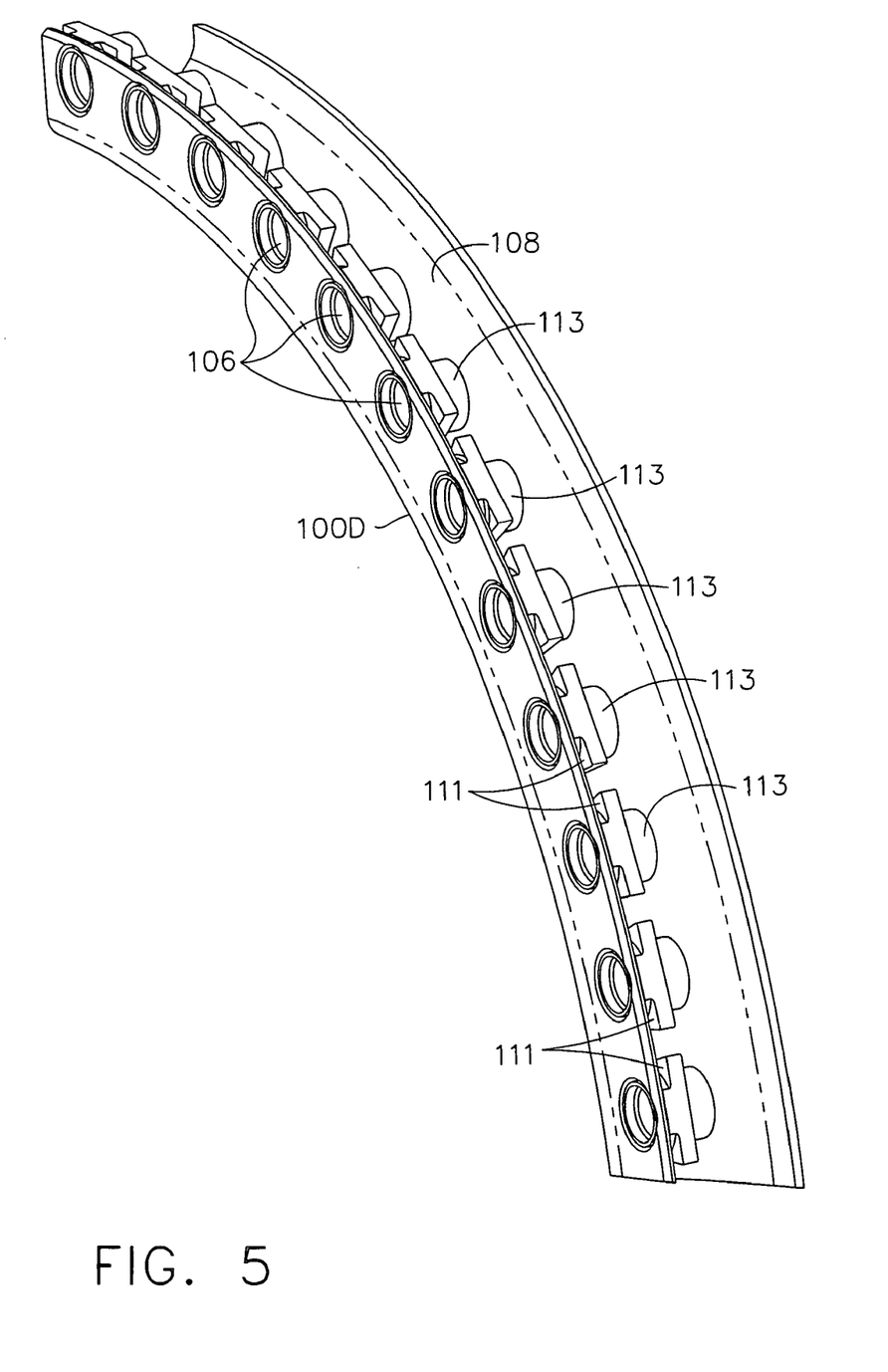
FIG. 5 is an enlarged view of a single segment of the fastener shield shown in FIG. 4.
Figure 6:
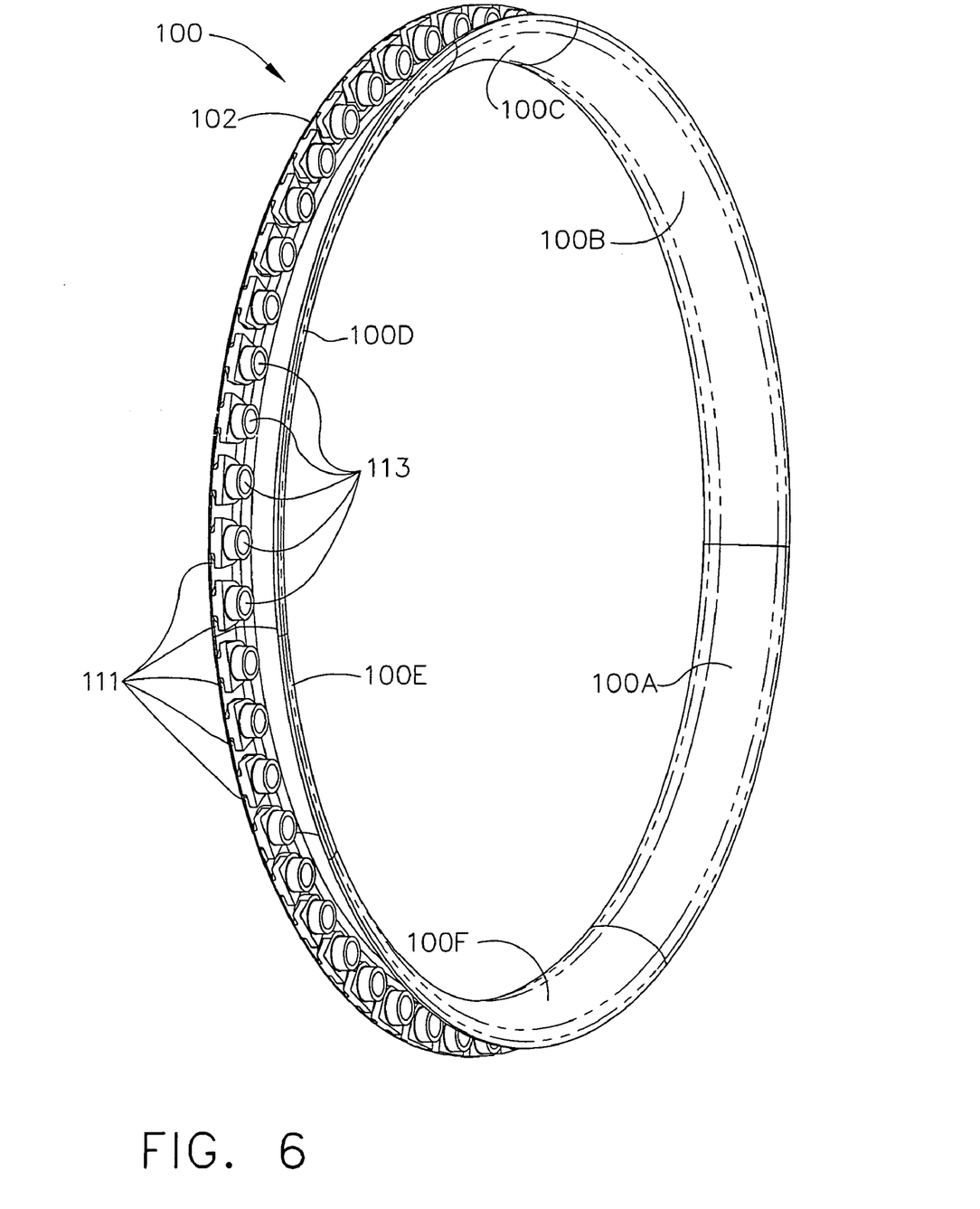
FIG. 6 is a perspective view of a second, upstream side of a fastener shield in accordance with an embodiment of the present invention.

As is best shown in FIGS. 5 and 6, the shield 100 includes shoulders 111 formed into each of the nuts 113. Nuts 113 are attached to the nutshield 108 using a swaging collar integral to the nut 113 which is swaged into a countersink in the bolt hole in nutshield 108.

Figure 7:
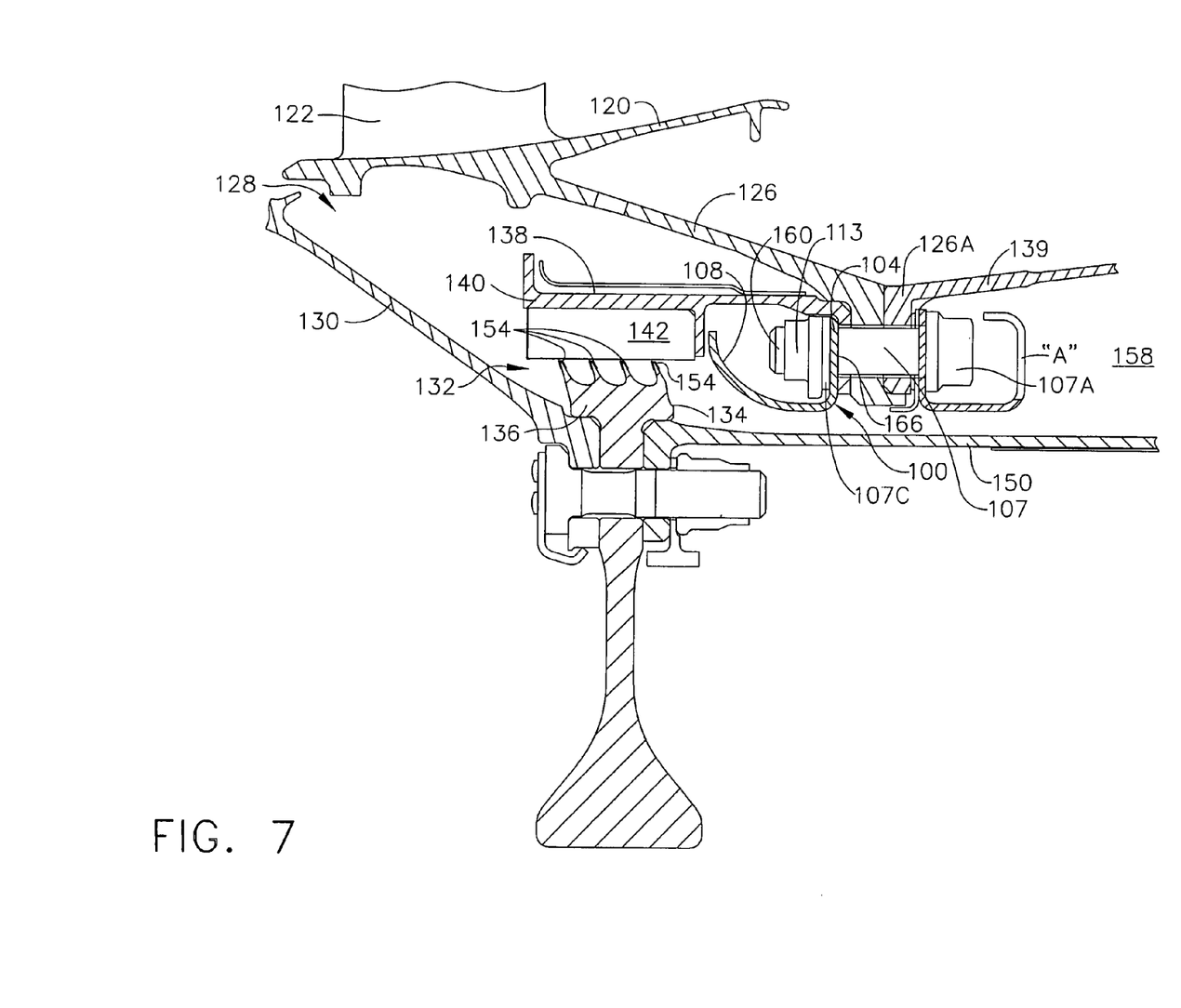
FIG. 7 is a fragmentary vertical cross-section of the fastener shield of FIG. 4.

Referring now to FIG. 7, the shape of the curved fastener shield cover 108 can be characterized as a "bellmouth" shape, and presents a progressive curve that simultaneously extends axially upstream against the direction of fluid flow and radially outwardly to a terminus.

The shield 100 acts in combination with a wall 120 extending in the downstream direction and formed integrally with the stage of outlet guide vanes 122. The outlet guide vanes 122 support the diffuser inner frames 126, as shown, in the proper relationship between upstream axial flow compressor 28 and downstream combustion chamber 30. As discussed previously, the turbine portion 34 of the gas turbine engine 10 is typically cooled by air pressurized by the compressor 28. This coolant air is bled from the engine airflow stream 21 through CDP bloker holes, not shown, in the diffuser inner frames 126.

The coolant flow rate is metered by the compressor discharge pressure (CDP) seal 134, which comprises a rotating seal portion 136 and a stationary seal portion 138. The CDP stationary seal portion 138 comprises a rigid CDP seal support 140 upon which a honeycomb seal 142 is bonded. The CDP stationary seal portion 138 is supported by radially extending diffuser frame flanges 126A and 139. The CDP rotating seal portion 136 is captured between rotor member 130 and shaft 150 as indicated and comprises a plurality of axially spaced annular labyrinth seal teeth 154 which are closely spaced from the honeycomb seal 142.

In order to obtain the desired metered amount of coolant flow, and yet minimize overall engine performance degradation, CDP seal 134 is designed to operate with minimal running clearances between the labyrinth seal teeth 154 and stationary honeycomb seal 142. The fastener shield 100 is positioned with the curved fastener shield cover 108 facing upstream over the bolts 107 that extend in closely spaced-apart relation through the bolt holes 106 and through the aligned and mated flanges 126A and 139. The bolts 107 project forward with the head 107A of each bolt 107 positioned in the downstream direction and the shank of the bolt 107, with a nut 113 threaded and properly torqued thereon, facing upstream. The nuts 113 are swaged into a backside countersink in the bolt holes 106. A washer 107C spaces the fastener shield 100 from the flange 126A. The fastener shield cover 108 thus provides a smooth, progressive curve against which gas fluid flow obliquely impinges as it moves downstream in the engine 10.

Note that the fastener shield 100 is a separate element from the CDP stationary seal portion 138 and the nut shield "A" covering the head 107A of bolt 107.

An aerodynamic fastener shield is described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

We claim:

1. A fastener shield for use in a fluid flow path within a gas turbine engine for reducing fluid drag and heating generated by fluid over a plurality of circumferentially spaced fasters, the fasteners having a portion thereof extending into the fluid flow path, the fastener shield comprising:
   (a) a radially-extending, downstream-mounting flange having a plurality of circumferentially spaced bolt holes positioned to receive respective engine mounting bolt holes positioned to receive respective engine mounting bolts therethrough and to attach the mounting flange to elements of the turbine engine; and
   (b) a curved, upstream-facing fastener shield cover positioned in spaced-apart relation to the mounting flange for at least partially covering and separating an exposed, upstream-facing portion of the bolts from the fluid flow to the removable with regard to a downstream-facing bolt cover for covering a downstream-face portion of the bolts, a compressor discharge pressure (CDP) stationary seal, and associated seal support with which the fastener shield cover is attached and adapted to cooperate for reducing aerodynamic drag in the turbine engine.

2. A fastener shield according to claim 1, wherein the mounting flange and fastener shield cover are integrally-formed.

3. A fastener shield according to claim 1, wherein the mounting flange and shield cover comprise joined, segmented arcuate elements.

4. A fastener shield according to claim 1, wherein the fastener shield comprises a single, integrally-formed annular element.

5. A fastener shield according to claim 1, wherein the elements of the turbine engine comprise radially extending diffuser frame flanges.

6. A fastener shield according to claim 1, wherein the curved shield cover comprises a bellmouth shape characterized by a progressive curve that simultaneously extends axially upstream against the direction of fluid flow and radially outwardly to a terminus.

7. A fastener shield according to claim 6, wherein the terminus is positioned in a plane defined by an extended longitudinal axis of the bolt.

8. A fastener shield for use in a fluid flow path within a gas turbine engine for reducing fluid drag and heating generated by fluid flow over a plurality of circumferentially spaced fasteners, the fasteners having a portion thereof extending into the fluid flow path, the fastener shield comprising:
   (a) a radially-extending, downstream-facing mounting flange having a plurality of circumferentially spaced bolt holes positioned to receive respective engine mounting bolts therethrough and to attach the mounting flange to elements of the turbine engine; and
   (b) a curved, upstream-facing fastener shield cover integrally-formed with and positioned in spaced-apart relation to the mounting flange for at least partially covering and separating an exposed, upstream-facing portion of the bolts from the fluid flow to thereby reduce drag and consequent heating of the bolts, the curved shield cover comprising a bellmouth shape characterized by a progressive curve that simultaneously extends axially upstream against the direction of fluid flow and radially outwardly to a terminus positioned in a plane defined by an extended longitudinal axis of the bolt.

9. A fastener shield according to claim 8, wherein the mounting flange and shield cover are segmented to define a plurality of arcuate elements.

10. A fastener shield according to claim 8, wherein the elements of the turbine engine comprise radially extending diffuser frame flanges.

11. A fastener shield according to claim 8, wherein the turbine engine comprises a low bypass turbofan engine.

12. A fastener shield for use in a fluid flow path within a gas turbine engine for reducing fluid drag and heating generated by fluid flow over a plurality of circumferentially spaced fasteners, the fasteners having a portion thereof extending into the fluid flow path, the fastener shield comprising a plurality of arcuate elements joined to collectively define:
   (a) an annular, radially-extending, downstream-facing mounting flange having a plurality of circumferentially spaced bolt holes positioned to receive respective engine mounting bolts therethrough and to attach the mounting flange to elements of the turbine engine; and
   (b) a curved, upstream-facing fastener shield cover positioned in spaced-apart relation to the mounting flange for at least partially covering and separating an exposed, upstream-facing portion of the bolts from the fluid flow to thereby reduce drag and consequent heating of the bolts, the curved shield cover comprising a bellmouth shape characterized by a progressive curve that simultaneously extends axially upstream against the direction of fluid flow and radially outwardly to a terminus positioned in a plane defined by an extended longitudinal axis of the bolt.

13. A fastener shield according to claim 12, wherein the mounting flange and fastener shield cover are integrally-formed.

14. A fastener shield according to claim 12, wherein the terminus is positioned in a plane defined by an extended longitudinal axis of the bolt.

15. A fastener shield according to claim 12, wherein the elements of the turbine engine comprise radially extending diffuser frame flanges.

16. A fastener shield according to claim 12, wherein the portion of the fastener extending into the fluid flow path comprises a terminal end portion of the bolt and a nut positioned thereon.

17. A fastener shield according to claim 12, wherein the turbine engine comprises a low bypass turbofan engine.

* * * * *

UNITED STATES PATENT AND TRADEMARK OFFICE
CERTIFICATE OF CORRECTION

PATENT NO.        : 7,249,463 B2  
APPLICATION NO.   : 10/941213  
DATED             : July 31, 2007  
INVENTOR(S)       : William C. Anderson Page 1 of 1

It is certified that error appears in the above-identified patent and that said Letters Patent is hereby corrected as shown below:

In Column 7, line 4, insert -- flow -- after "fluid".

In Column 7, line 4, delete "fasters" and substitute -- fasteners -- therefore.

In Column 7, line 7, delete "downstream-mounting" and substitute -- downstream-facing mounting -- therefor.

In Column 7, lines 9-10, delete "bolt holes positioned to receive respective engine mounting bolts".

In Column 7, line 17, delete "the removable" and substitute -- thereby reduce drag and consequent heating of the bolts, the fastener shield cover being separate from and separately-removable -- therefor.

Signed and Sealed this

Sixteenth Day of October, 2007

JON W. DUDAS  
*Director of the United States Patent and Trademark Office*